US010069409B2

(12) United States Patent
Bulzacchelli et al.

(10) Patent No.: US 10,069,409 B2
(45) Date of Patent: Sep. 4, 2018

(54) DISTRIBUTED VOLTAGE REGULATION SYSTEM FOR MITIGATING THE EFFECTS OF IR-DROP

(71) Applicant: International Business Machines Corporation, Armonk, NY (US)

(72) Inventors: John F. Bulzacchelli, Somers, NY (US); Michael A. Sperling, Poughkeepsie, NY (US); Zeynep Toprak Deniz, Norwalk, CT (US)

(73) Assignee: International Business Machines Corporation, Armonk, NY (US)

( * ) Notice: Subject to any disclaimer, the term of this patent is extended or adjusted under 35 U.S.C. 154(b) by 77 days.

(21) Appl. No.: 15/263,466

(22) Filed: Sep. 13, 2016

(65) Prior Publication Data

US 2018/0076708 A1    Mar. 15, 2018

(51) Int. Cl.
G05F 1/10    (2006.01)
G05F 3/02    (2006.01)
H02M 3/07    (2006.01)

(52) U.S. Cl.
CPC .................................. H02M 3/07 (2013.01)

(58) Field of Classification Search
CPC . G05F 1/465; G05F 1/56; G05F 1/575; G05F 3/30; G11C 5/147
USPC .............................. 327/530, 538; 307/31–33
See application file for complete search history.

(56) References Cited

U.S. PATENT DOCUMENTS 5,796,982 A * 8/1998 Iwami ............... H02M 3/33561
                                                323/281
7,135,842 B2   11/2006 Banerjee et al.
(Continued)

FOREIGN PATENT DOCUMENTS

EP       2804067 A1    11/2014

OTHER PUBLICATIONS

Bulzacchelli et al., "Dual-Loop System of Distributed Microregulators With High DC Accuracy, Load Response Time Below 500 ps, and 85-mV Dropout Voltage", IEEE Journal of Solid-State Circuits, vol. 47, No. 4, Apr. 2012, © 2012 IEEE, 12 pages.
(Continued)

*Primary Examiner* — Quan Tra
(74) *Attorney, Agent, or Firm* — Steven F. McDaniel; Arnold B. Bangali (57) ABSTRACT

A distributed voltage regulator includes multiple micro-regulators disposed in a corresponding set of circuit sectors of an integrated circuit. Each micro-regulator provides current to the corresponding circuit sector at a current injection point. The regulator also includes a control module configured to receive feedback signals corresponding to a one or more sense points within each circuit sector and provide a control signal to each micro-regulator. The control module limits load-sharing imbalance within the plurality of micro-regulators. A voltage regulator with multiple sense points includes a micro-regulator that provides current at a current injection point, and a control module that receives feedback signals corresponding to a plurality of sense points and provides a control signal to the micro-regulator. The micro-regulator may comprise a charge pump that provides a local reference voltage that enables the micro-regulator to suppress local voltage drooping during feedback transitions (e.g., while switching between different feedback signals).

20 Claims, 7 Drawing Sheets

Power Domain with Multiple Sectors
Four sector example

(56) References Cited

U.S. PATENT DOCUMENTS

| | | | |
|---|---|---|---|
| 7,345,495 B2 | 3/2008 | Dangelo et al. | |
| 8,426,924 B2 | 4/2013 | Jwalant et al. | |
| 8,760,217 B2 | 6/2014 | Chua-Eoan et al. | |
| 8,841,893 B2 | 9/2014 | Bulzacchelli et al. | |
| 2003/0034792 A1* | 2/2003 | Ostrom | G06F 1/305 |
| | | | 361/42 |
| 2008/0129341 A1* | 6/2008 | Mochizuki | G01K 7/425 |
| | | | 326/86 |
| 2010/0013305 A1* | 1/2010 | Heineman | H02J 1/102 |
| | | | 307/31 |
| 2012/0153909 A1* | 6/2012 | Bucossi | H02M 1/15 |
| | | | 323/271 |
| 2014/0070876 A1 | 3/2014 | Paillet et al. | |
| 2015/0054574 A1* | 2/2015 | Bulzacchelli | G05F 1/10 |
| | | | 327/540 |

OTHER PUBLICATIONS

Fluhr et al., "The 12-Core POWER8™ Processor With 7.6 Tb/s IO Bandwidth, Integrated Voltage Regulation, and Resonant Clocking", IEEE Journal of Solid-State Circuits, vol. 50, No. 1, Jan. 2015, © 2014 IEEE, 14 pages.

Shayan et al., "Parallel Flow to Analyze the Impact of the Voltage Regulator Model in Nanoscale Power Distribution Network", 10th Int'l Symposium on Quality Electronic Design, © 2009 IEEE, 6 pages.

Toprak-Deniz et al., "Distributed System of Digitally Controlled Microregulators Enabling Per-Core DVFS for the POWER8TM Microprocessor", ISSCC 2014 / Session 5 / Processors / 5.2, 2014 IEEE International Solid-State Circuits Conference, © 2014 IEEE, 3 pages.

\* cited by examiner

DISTRIBUTED VOLTAGE REGULATION SYSTEM FOR MITIGATING THE EFFECTS OF IR-DROP

BACKGROUND OF THE INVENTION

The present invention relates generally to electronic circuits such as integrated circuits, and more particularly to mitigating IR-drop in such circuits.

A power distribution network (e.g., a power grid) for an integrated circuit distributes power and ground voltages from pad locations to all devices in an integrated circuit. Shrinking device dimensions, faster switching frequencies, and increasing power consumption in deep sub-micrometer technologies cause large switching currents to flow in the power and ground networks. Due to the resistance of the pathways constituting the network, there is a voltage drop across the network, commonly referred to as IR-drop. IR-drop reduces the effective voltage seen by integrated circuit elements and may negatively affect circuit performance.

SUMMARY

A distributed voltage regulator includes a plurality of micro-regulators disposed in a corresponding plurality of circuit sectors of an integrated circuit, each micro-regulator configured to provide current to the corresponding circuit sector at a current injection point, and a control module configured to receive a plurality of feedback signals corresponding to a one or more sense points within each circuit sector and provide a control signal to each micro-regulator. The control module is configured to limit load-sharing imbalance within the plurality of micro-regulators. A corresponding method is also disclosed herein.

A voltage regulator with multiple sense points includes a micro-regulator disposed in an integrated circuit and configured to provide current to the integrated circuit at a current injection point, and a control module configured to receive a plurality of feedback signals corresponding to a plurality of sense points within the integrated circuit and provide a control signal to the micro-regulator. In some embodiments, the micro-regulator comprises a charge pump that provides a local reference voltage that enables the micro-regulator to suppress local voltage drooping during feedback transitions (e.g., while switching between different feedback signals).

DETAILED DESCRIPTION

The embodiments disclosed herein enable improved voltage regulation that compensates for IR-drop in a power grid for an integrated circuit. It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention. These features and advantages will become more fully apparent from the following drawings, description and appended claims, or may be learned by the practice of the invention as set forth hereinafter.

Figure 1:
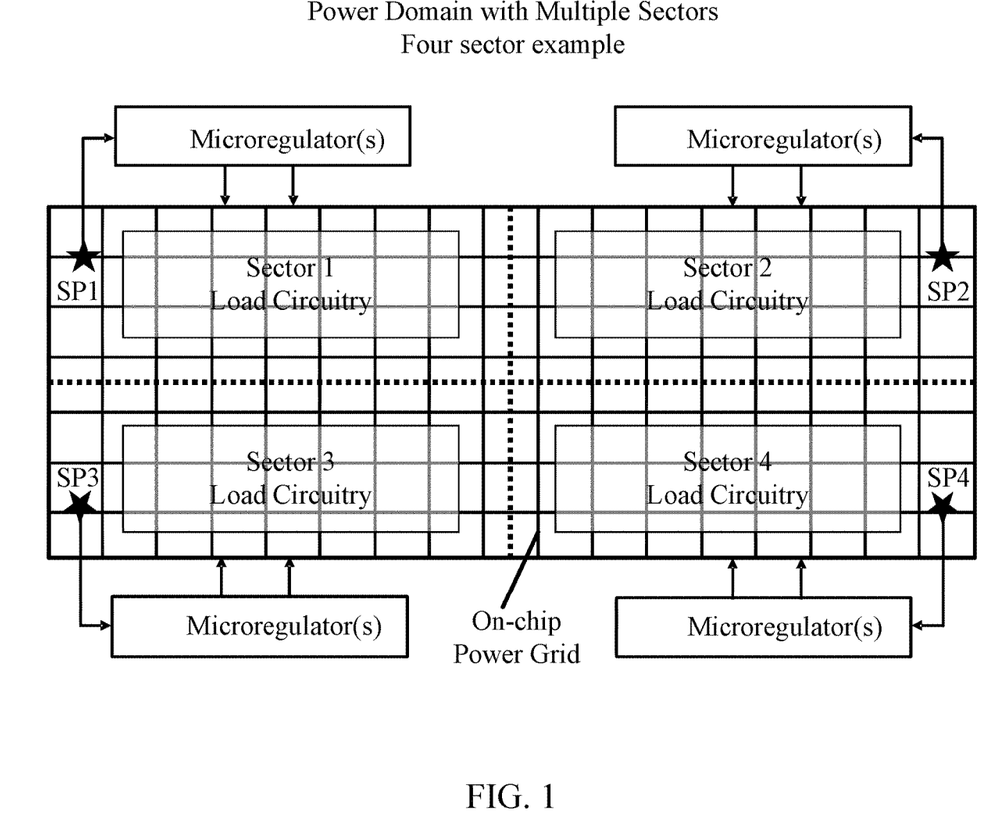
FIG. 1 depicts one example of an environment in which the present invention may be deployed.

FIG. 1 depicts one example of an environment in which the present invention may be deployed. A single power domain of an integrated circuit may be divided into multiple sectors. Since all the circuits belong to the same power domain, they are all connected to a single (unbroken) power grid. While the grid itself is unbroken, different regions of the power grid (including the load circuitry in those regions) can be considered as distinct circuit sectors. The size of each circuit sector can be chosen to be small enough that the IR drop across one sector is negligible (e.g., <10 mV). Within each sector, the voltage of the supply grid can be sensed with a dedicated sense point: e.g., SP1 for sector 1, SP2 for sector 2, and so on. The voltages at these sense points can then be used to adjust micro-regulators associated with the respective circuit sectors. Such local use of micro-regulators within each circuit sector reduces the magnitudes of IR-related voltage gradients across the power grid. It may also lead to highly unbalanced load sharing among micro-regulators, but the present invention provides a mechanism for limiting load sharing imbalances to acceptable levels (as discussed below).

The embodiments disclosed herein recognize that reducing IR-drop across an integrated circuit reduces the need for voltage guard bands and may result in significant energy savings. The embodiments disclosed herein also recognize that distributed voltage regulation using micro-regulators may result in some micro-regulators being unused while others are heavily used. The embodiments disclosed herein also recognize that voltage droop may occur when switching between multiple sensors in a voltage regulation system (e.g., in response to changing hot spots on an integrated circuit). At least some of the embodiments disclosed herein also recognize that micro-regulators that are currently unused may not be responsive to sudden changes in load current.

Figure 2A:
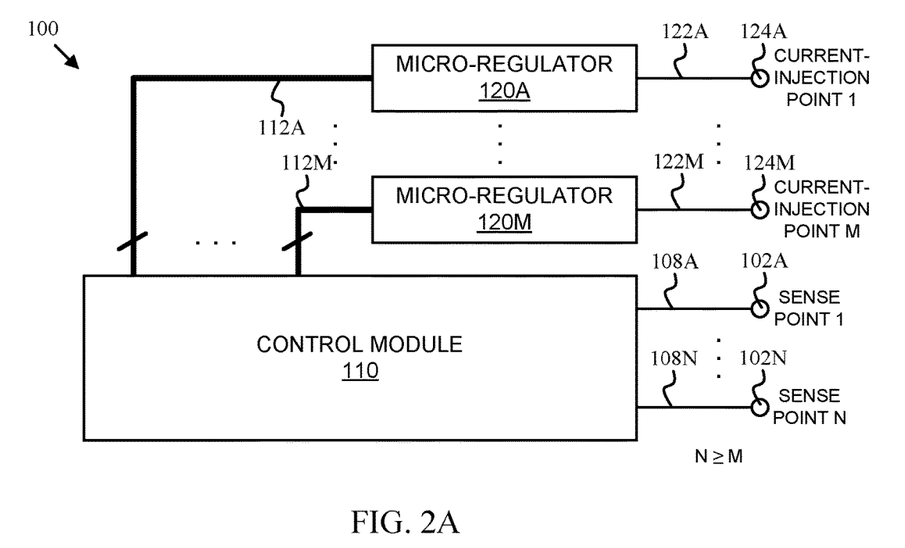
FIG. 2A is block diagram of one example of a distributed voltage regulator in accordance with at least one embodiment of the present invention.

FIG. 2A is block diagram of one example of a distributed voltage regulator 100 in accordance with at least one embodiment of the present invention. As depicted, the distributed voltage regulator 100 includes a control module 110 and multiple micro-regulators 120. The distributed voltage regulator 100 provides improved voltage regulation for an integrated circuit or the like.

The control module 110 receives a set of feedback signals 108 (e.g., 108A-108N) corresponding to a set of sense points 102 (e.g., 102A-102N) and provides a set of control signals 112 (e.g., 112A-112M). In the depicted embodiment, the feedback signals 108 are analog signals and the control signals 112 are digital signals that provide feedback codes to the micro-regulators 120 (e.g., 120A-120M). In some embodiments, the micro-regulators 120 comprise charge pumps and the feedback codes are UP/DOWN codes that boost or diminish the voltage on a charge pump capacitor.

The micro-regulators 120 receive the control signals 112 and provide an injection current 122 (e.g., 122A-122M) to a current injection point 124 (e.g., 124A-124M). The micro-regulators 120 may also be disposed in, or proximate to, various circuit sectors (see FIG. 1) of an integrated circuit, or the like, such that each circuit sector has one or more dedicated micro-regulators 120. The current-injection point 124 that is driven by a micro-regulator 120 may also be disposed in the same circuit sector as the micro-regulator 120.

One approach to controlling the micro-regulators 120 would be to have each control signal 112 be directly responsive to the feedback signal(s) 108 that correspond to the sense point(s) 102 that is(are) within the same circuit sector as the current injection point 124 and one or more micro-regulators 120. Each micro-regulator would tend to approach a current injection rate (e.g., duty cycle in the case of a switching regulator) that matches the local current draw and substantially eliminates IR drops. However, such an approach may result in some micro-regulators 120 being driven to an off state (zero percent current delivery) while others may be fully engaged. Micro-regulators that are in an off state may not be responsive to sudden changes in load current. To prevent such a load imbalance and improve responsiveness, the depicted control module 110 is configured to limit load-sharing imbalances to a specified limit (i.e., ratio) such as 20:1. Consequently, the ratio of the highest injection current 122 to the lowest injection current 122 would not exceed the specified limit.

Figure 2B:
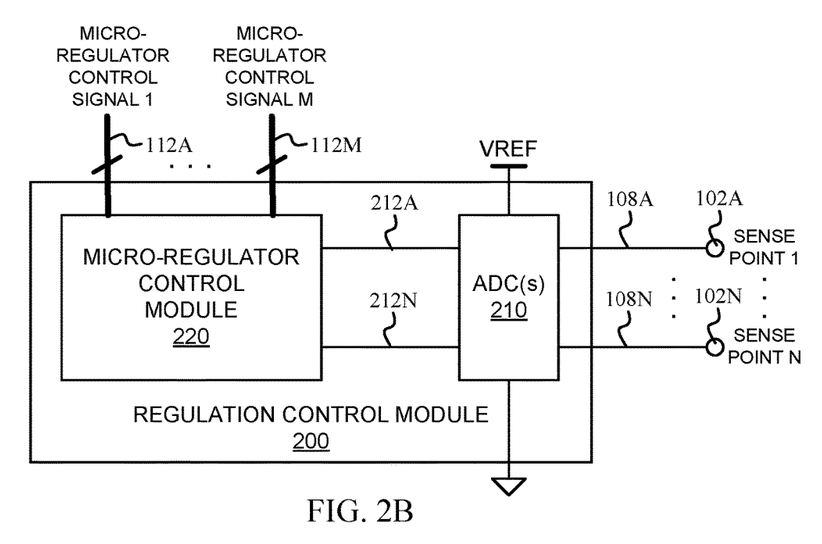
FIG. 2B is block diagram of one example of a regulation control module in accordance with at least one embodiment of the present invention.

FIG. 2B is block diagram of one example of a regulation control module 200 in accordance with at least one embodiment of the present invention. As depicted, the regulation control module 200 includes one or more voltage sensors 210 and a micro-regulator control module 220. The regulation control module 200 is one example of the control module 110 depicted in FIG. 2A.

The voltage sensors 210 sense the voltages of the feedback signals 108 corresponding to the sense points 102 (e.g., 102A-N) and provide sensed signals 212. In the depicted embodiment, the voltage sensors 210 are embodied as one or more analog-to-digital converters and the sensed signals 212 are digital signals that have the sensed voltages (or an error signal for the sensed voltages) encoded thereon. In one particular embodiment, the voltage sensors 210 are embodied as a time-multiplexed analog-to-digital converter that sequentially scans through the feedback signals 108 and provides the sensed signals 212. In some embodiments, including versions of the depicted embodiments, the sensed signals 212 are digitized error signals that are generated by analog differencing of the feedback signals 108 to a reference voltage VREF and digitizing the resulting difference to provide the sensed signals 212.

The micro-regulator control module 220 receives the sensed signals 212 and provides the control signals 112 that control the micro-regulators 120. The micro-regulator control module 220 may limit the imbalance of the current provided (i.e., load carried) by the various micro-regulators 120. In some embodiments, the micro-regulator control module directly or indirectly determines the current provided by each micro-regulator and makes adjustments to the control signals 112 to limit the load imbalance on the micro-regulators. For example, the micro-regulator control module 220 may estimate or track the current provided by each micro-regulator from the control signals 112 (e.g., digital feedback codes). Alternately, the micro-regulator control module 220 may directly receive load current information from each micro-regulator via a communication bus or the like (not shown).

The micro-regulator control module 220 may prevent micro-regulators from being driven to an off state by making adjustments to the control signals 112 (e.g., digital feedback codes). In some embodiments, the micro-regulator control module 220 limits the ratio of the highest provided current and the lowest provided current to a selected limit (e.g., 20:1). In other embodiments or additionally, the micro-regulator control module 220 enforces lower and/or upper limits on the amount of current provided by each micro-regulator 120.

In certain embodiments, the micro-regulator control module 220 ensures that limiting the load imbalance between the micro-regulators 120 does not significantly change the total current provided to the integrated circuit. For example, when the current provided by micro-regulators for one or more circuit sectors is adjusted to limit an imbalance, counter adjustments may be made to the micro-regulators of adjacent circuit sectors.

It should be noted that in a multi-sector regulation system, one sector may overwhelm the other sectors and provide all the current necessary to generate the desired output voltage. When this occurs, the micro-regulators in the other sectors may fall into an inactive (zero percent current delivery) state, and their internal sense voltages can drift, which impairs their ability to respond to a sudden change in load current. In some embodiments, the micro-regulator control module 220 mitigates this situation by incorporating control logic that generates an 'UP' code if a sector has not seen an UP code over a selected time interval. In one embodiment, the control logic includes a counter that is reset to a value corresponding to the selected time interval in response to generation of an UP code. Upon counting down and reaching zero, an extra UP code is generated to maintain a minimum current injection rate for each micro-regulator and thereby prevent drifting of their internal sense voltages. In one embodiment, setting the selected time interval (i.e., the counter reset value) limits the amount of load sharing imbalance to a selected value (e.g., 20:1 or 50:1) corresponding to the selected time interval.

Figure 3:
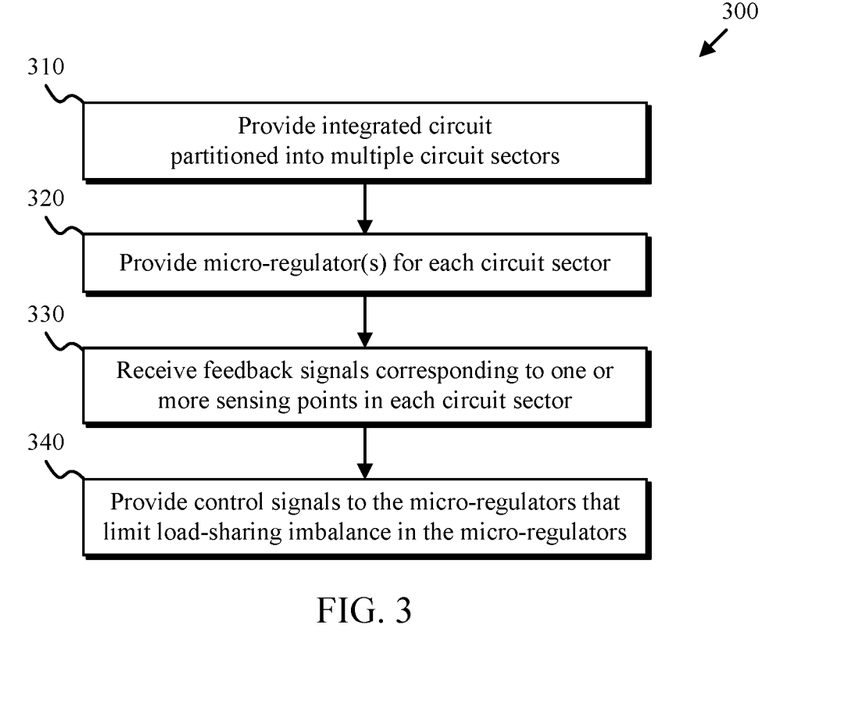
FIG. 3 is flowchart of one example of a voltage regulation method in accordance with at least one embodiment of the present invention.

FIG. 3 is flowchart of one example of a voltage regulation method 300 in accordance with at least one embodiment of the present invention. As depicted, the voltage regulation method 300 includes providing (310) an integrated circuit, providing (320) a micro-regulator for each circuit sector, receiving (330) feedback signals, and providing (340) control signals to the micro-regulators.

Providing (310) an integrated circuit may include providing an integrated circuit partitioned into multiple circuit sectors. Providing (320) a micro-regulator for each circuit sector may include placing in each circuit sector, or proximate thereto, a micro-regulator to provide current to that circuit sector, adjoining circuit sectors, and the integrated circuit as a whole.

Receiving (330) feedback signals may include receiving feedback signals corresponding to one or more sense points in each circuit sector. Providing (340) control signals to the micro-regulators may include providing control signals that substantially eliminate IR drop within an integrated circuit and also limit load-sharing imbalances amongst the micro-regulators. For example, in one embodiment load-sharing imbalances are limited to a specified limit (i.e., ratio) such as 20:1. Limiting load-sharing imbalances may prevent zero percent current delivery operation in each micro-regulator.

Figure 4A:
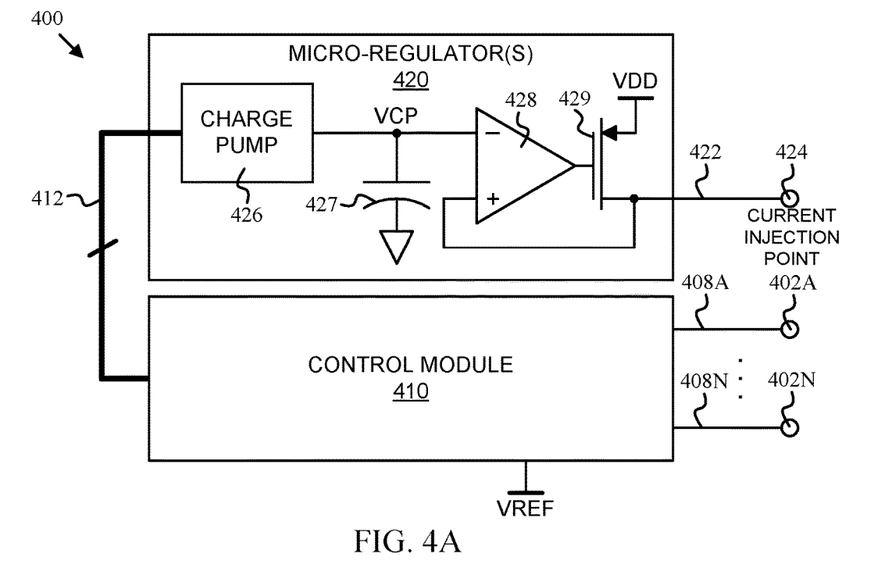
FIG. 4A is block diagram of one example of a voltage regulator with multiple sense points in accordance with at least one embodiment of the present invention.

FIG. 4A is block diagram of one example of a voltage regulator 400 with multiple sense points in accordance with at least one embodiment of the present invention. As depicted, the voltage regulator 400 includes a control module 410 and multiple micro-regulators 420. The voltage regulator 400 provides improved voltage regulation for an integrated circuit or the like.

The control module 410 receives a set of feedback signals 408 (e.g., 408A-408N) corresponding to a set of sense points 402 (e.g., 402A-402N) and provides a control signal 412 to one or more micro-regulators 420. In one embodiment, the voltage regulator 400 is a complete (independent) regulator system. In other embodiments, the voltage regulator 400 may represent the regulation components used in one sector of a multi-sector regulation system such as that shown in FIG. 2A. In that case, each micro-regulator (or group of micro-regulators) 420 shown in FIG. 4A corresponds to a specific micro-regulator (or group of micro-regulators) 120 (e.g., 120A or 120B or . . . 120M) shown in FIG. 2A.

In the depicted embodiment, the feedback signals 408 are analog signals and the control signal 412 is a digital signal that provides up/down codes to the micro-regulator 420. In another embodiment, the control signal 412 is an analog signal and may be a differential signal. In a preferred embodiment, the control module 410 determines the feedback signal 408 with the lowest voltage and provides digital feedback codes to maintain the lowest voltage at a reference voltage VREF. Providing digital feedback codes may prevent the introduction of noise into the control signal 412. In certain embodiments, there are multiple micro-regulators 420 that are each disposed in, or proximate to, various circuit sectors of an integrated circuit similar to the distributed voltage regulator of FIG. 2A.

The micro-regulator 420 receives the control signal 412 and provides an injection current 422 to a current injection point 424. The depicted micro-regulator 420 includes a charge pump 426 that is responsive to the control signal 412 and adjusts a local reference voltage VCP maintained by a local reference capacitor 427 and provided to a comparator 428. In turn, the comparator 428 drives a current injection transistor 429 which provides current 422 to the current injection point 424.

One of skill in the art will appreciate that the control module 410 may detect and select the feedback signal 408 with the lowest voltage for tracking and then adjust current injection via the control signal 412 according to the selected feedback signal 408. One of skill in the art will also appreciate that detection and selection does not occur instantaneously and that voltage drooping could occur until feedback and control stabilize. To counteract this issue, the local reference voltage (VCP) maintained by the local reference capacitor 427 serves as a stable reference voltage for the comparator 428 even before the feedback selection is completed, which allows the comparator 428 to activate the current injection transistor 429 in response to local voltage drooping. This suppression of local voltage drooping during feedback transitions (e.g., while switching between different feedback signals) will now be described in greater detail.

Figure 4B:
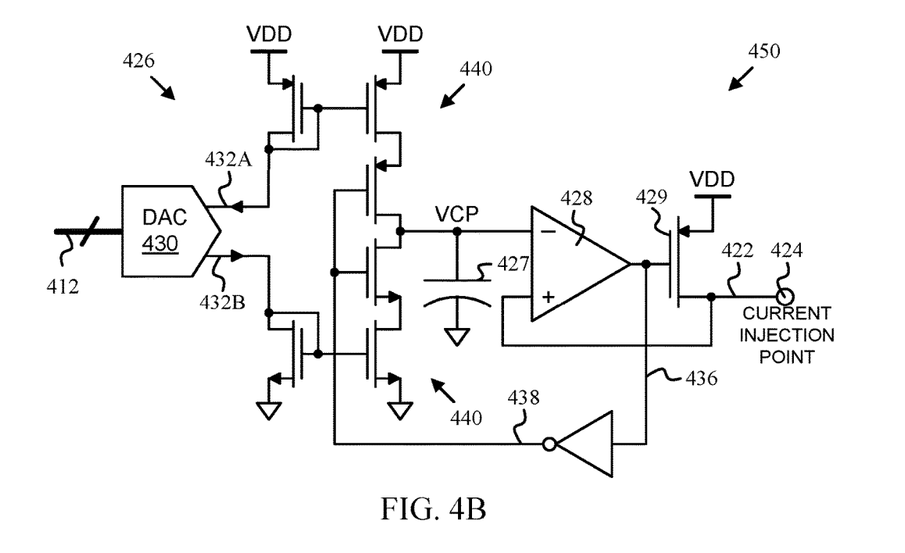
FIG. 4B is schematic diagram of one example of a micro-regulator in accordance with at least one embodiment of the present invention.

FIG. 4B is schematic diagram of one example of a micro-regulator 450 in accordance with at least one embodiment of the present invention. As depicted, micro-regulator 450 includes the local reference capacitor 427 which maintains the local reference voltage VCP received by the comparator 428 which, in turn, drives the current injection transistor 429. In the depicted embodiment, the charge pump 426 includes a DAC 430 which receives the control signal 412 and provides differential currents 432 to a set of driving transistors 440. The micro-regulator 450 is one example of the micro-regulator 420 and the micro-regulator 120.

In the depicted embodiment, the differential currents 432 include an UP current 432A and a DOWN current 432B. Consequently, the control signal 412 provided as an input to the DAC 430 may be referred to as an UP/DOWN code 412 which determines a ratio of the UP current 432A to the DOWN current 432B.

In addition to the differential currents 432, another input to the charge pump 426 (e.g., of each micro-regulator 120 or 420) is the output 436 of the comparator 428. In the depicted embodiment, the output 436 is inverted to generate a feedback signal 438 which has a polarity such that the local reference capacitor 427 is charged upward when the current injection transistor 429 (e.g., pFET) is off, and charged downward when the current injection transistor 429 is on. Charging upward and downward in the described manner provides negative feedback and stabilizes the duty cycle of the micro-regulator 450. To maintain a specific charge level on the local reference capacitor 427 a corresponding duty cycle for the conduction (on) state of the current injection transistor 429 will occur. When the duty cycle of the conduction state of the current injection transistor 429 is D, equilibrium of the charge pump 426 is achieved when:

$$\text{UP/DOWN ratio} = D/(1-D) \tag{1}$$

Equation 1 shows how the average (steady state) duty cycle D is related to the UP/DOWN ratio or UP/DOWN code 412. A high UP/DOWN ratio corresponds to a high duty cycle (high current delivery), while a low UP/DOWN ratio corresponds to a low duty cycle (low current delivery). In some embodiments, the control module 110 or 410 is configured to measure this ratio via a timer and mitigate load imbalances when multiple micro-regulators 120 or 420 (e.g., in a multi-sector regulation system) are controlled by the control module 110 or 410. In one embodiment, the control module 110 or 410 includes logic which sets a minimum value for the UP/DOWN code 112 or 412 delivered to the micro-regulators 120 or 420. Setting a minimum value for the UP/DOWN code avoids zero (or extremely low) current delivery in a micro-regulator and thereby avoids an extreme load imbalance amongst multiple micro-regulators 120 or 420. In another embodiment, the DAC 430 is biased to have a minimum UP/DOWN current ratio.

Figure 5A:
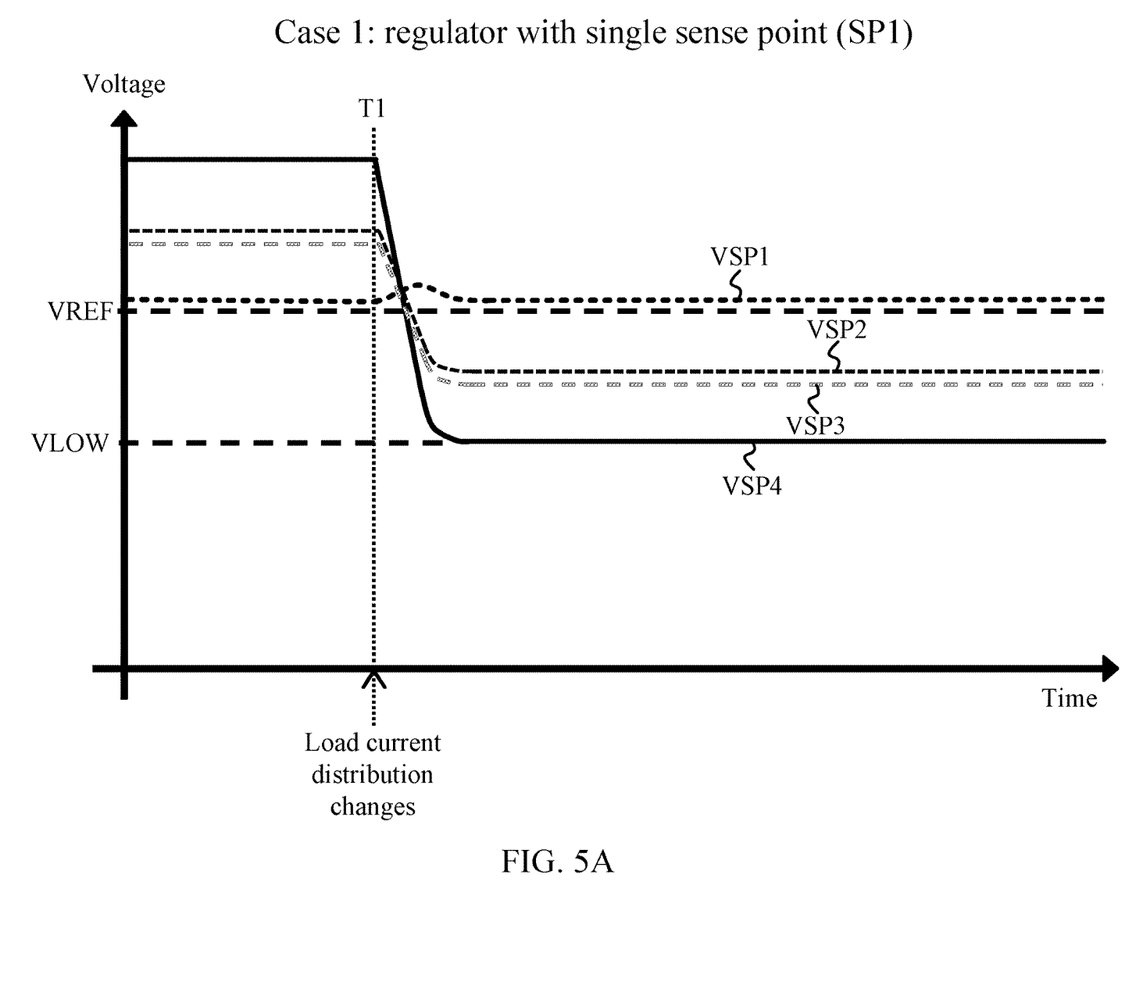
FIGS. 5A-5C are waveform diagrams that illustrate how combining multiple sense points with micro-regulators tuned by charge pumps suppresses both short-term and long-term IR-related voltage droops.
Figure 5B:
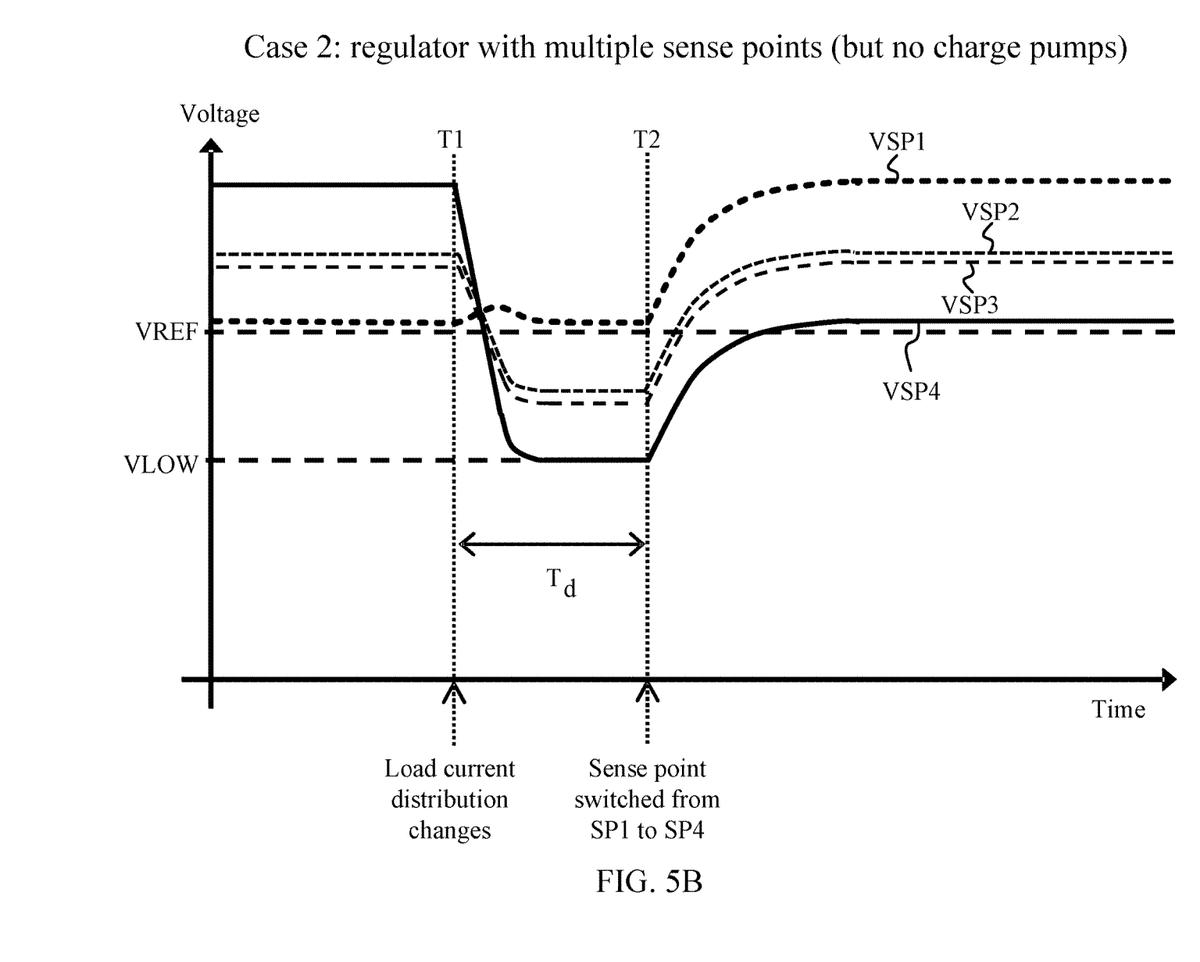
Figure 5C:
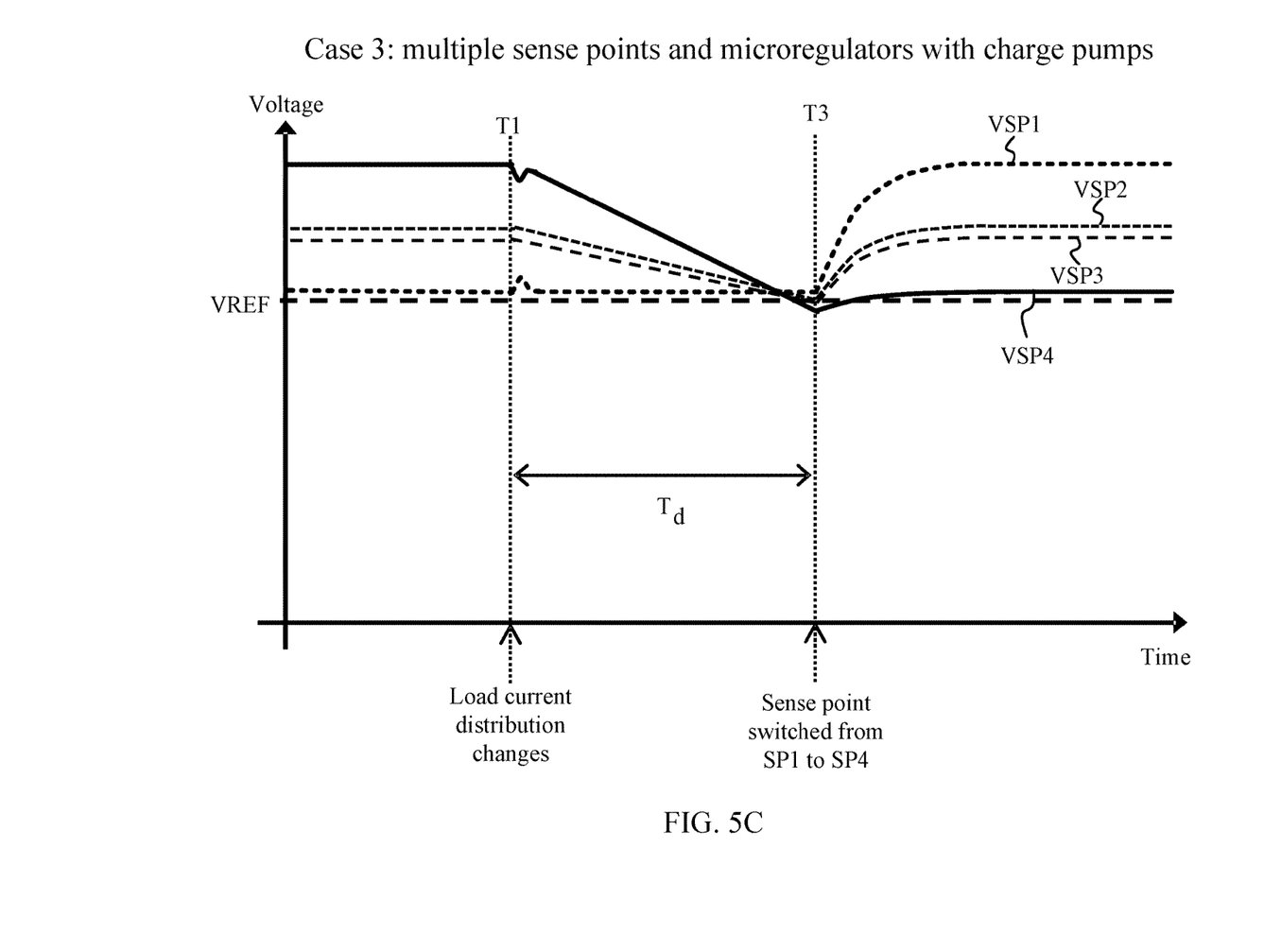

FIGS. 5A-5C show waveforms that illustrate how combining multiple sense points with micro-regulators tuned by charge pumps suppresses both short-term and long-term IR-related voltage droops. Consider a power domain of an integrated circuit which has been divided into four regions, each of which has a voltage sense point referred to herein as SP1, SP2, SP3, and SP4. FIG. 5A shows how such a regulator system with a single sense point (in this case SP1) responds to a sudden change in load current distribution. Before time T1, the region near SP1 experiences high load current while the region near SP4 experiences minimum load current. [Note: In the depicted example, the load currents in the regions near SP2 and SP3 are moderate in value and unchanging.] Consequently, the voltage (VSP1) at SP1 is lower than at the other sense points, and the voltage (VSP4) at SP4 is higher than at the other sense points. Since SP1 is the sense point for the regulator, voltage VSP1 is close to the desired target (VREF). At time T1, the load current distribution changes very quickly so that the region near SP1 suddenly experiences minimum load current while the region near SP4 suddenly experiences high load current. Since the voltage at SP1 is actively maintained by the regulator, VSP1 remains close to VREF (aside from a small disturbance associated with the regulator's dynamics). Due to the IR drops on the power grid, the voltages at the other sense points are pulled below VREF. In particular, the voltage (VSP4) at SP4 is pulled down to a voltage VLOW, whose low value may cause operational problems for the load circuits in that region.

In principle, one may try to mitigate this voltage droop problem by switching the feedback signal to the regulator. Specifically the feedback can be switched so that the sense point with the lowest voltage (at a given time) is the one used to control the regulation loop. While such a scheme effectively protects the load circuitry from voltage droops under steady state conditions, delay in detecting the lowest sense point voltage and selecting the proper feedback signal may undermine the effectiveness of the system, as shown in FIG. 5B. The change in load current distribution is identical to that in FIG. 5A. After the load current distribution changes at time T1, the voltage at SP4 quickly drops below that of the other sense points. Due to the circuit delays, however, the sense point is only switched from SP1 to SP4 at time T2 after a delay Td. During this transition time, the voltage at SP4 still sags to the same low level (VLOW) as in FIG. 5A. Once the new sense point is selected, the regulator raises VSP4 back up to the desired value (VREF), and the low voltage condition is eventually eliminated. Even though only temporary, the low voltage condition (droop) still causes operational problems for the load circuits in that region.

Switching the feedback signals from different sense points becomes much more effective when each region (sector) has one or more micro-regulators tuned by charge pumps, as the charge pumps provide reference voltages with a significant amount of ballast (inertia) to each micro-regulator, so that the micro-regulators actively resist sudden voltage droops in their vicinity. The response of a system of micro-regulators with charge pumps to the sudden change in load current distribution is shown in FIG. 5C. Before the change in load current distribution at time T1, the voltages at the sense points are identical to those in FIGS. 5A and 5B. The active sense point is SP1, so voltage VSP1 is close to the desired target (VREF). Due to the IR-related voltage gradients across the grid, the voltages at the other sense points are higher than VREF.

The charge pump system keeps the micro-regulators in these regions active (with non-zero current delivery) by adjusting the voltages on the charge pump capacitors. For instance, the micro-regulator(s) near SP4 are kept active because their charge pump voltages (and therefore their reference voltages) are higher than those of the other micro-regulators. Therefore, when the load current distribution suddenly changes, and the load current near SP4 becomes very high, the micro-regulators in that region fight the droop by increasing their current delivery (e.g., duty cycle) very quickly (a form of active regulation). Due to current delivery (e.g., high duty cycle), the charge pump voltages in these micro-regulators do start to discharge, so VSP4 does start to come down, but the rate of decrease is quite slow since the I/C ratio of the charge pumps is a low value by design. (Note: the time scale of FIG. 5C may be several times longer than those of FIGS. 5A and 5B.) If the sense point were never switched (as in a single sense point system), VSP4 would eventually drop to the same low voltage level (VLOW) as seen in the droops of FIGS. 5A and 5B. However, the slow rate of decrease in voltage VSP4 makes feedback switching very effective. As long as the time it takes (e.g., 10 ns) to detect the lowest sense point voltage and select the proper feedback signal is much shorter than the time it takes (e.g., 1 microsecond) to discharge the charge pump capacitor voltage, the droop below the target (VREF) can be held to a negligible value (e.g., <5 mV), as shown in FIG. 5C.

It should be noted that this description is not intended to limit the invention. On the contrary, the embodiments presented are intended to cover some of the alternatives, modifications, and equivalents, which are included in the spirit and scope of the invention as defined by the appended claims. Further, in the detailed description of the disclosed embodiments, numerous specific details are set forth in order to provide a comprehensive understanding of the claimed invention. However, one skilled in the art would understand that various embodiments may be practiced without such specific details.

Although the features and elements of the embodiments disclosed herein are described in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. An apparatus comprising:
   a plurality of micro-regulators disposed in a corresponding plurality of circuit sectors, each micro-regulator configured to provide current to the corresponding circuit sector at a current injection point;
   a control module configured to receive a plurality of feedback signals corresponding to one or more sense points within each circuit sector and provide a control signal to each micro-regulator, wherein in response to at least one sector being overwhelmed by other sectors, causing the at least one sector to fall into an inactive current state, the micro-regulator corresponding to the at least one sector mitigates the inactive current state by incorporating control logic that generates an UP code over a selected time interval; and
   wherein the control module is configured to limit load-sharing imbalance within the plurality of micro-regulators.

2. The apparatus of claim 1, wherein the control signals reduce IR related voltage gradients across a power grid.

3. The apparatus of claim 1, wherein the load-sharing imbalance is limited to 20:1.

4. The apparatus of claim 1, wherein limiting load-sharing imbalance prevents zero current delivery operation in each micro-regulator.

5. The apparatus of claim 1, further comprising one or more voltage sensors configured to sense a circuit voltage corresponding to each of the plurality of sense points.

6. The apparatus of claim 5, wherein the one or more voltage sensors comprise one or more analog-to-digital converters.

7. The apparatus of claim 5, wherein the one or more voltage sensors are configured to sense a circuit voltage at a second sensing point in at least one circuit sector of the plurality of circuit sectors.

8. The apparatus of claim 7, wherein the control module selects a lowest voltage feedback signal within a circuit sector.

9. The apparatus of claim 1, wherein the plurality of feedback signals comprise analog signals.

10. The apparatus of claim 9, wherein the control module comprises a time-multiplexed ADC.

11. The apparatus of claim 1, wherein at least one micro-regulator of the plurality of micro-regulators comprises a charge pump.

12. The apparatus of claim 11, wherein the control signal for the at least one micro-regulator comprises digital UP/DOWN codes that control the charge pump.

13. A method comprising:
providing an integrated circuit partitioned into a plurality of circuit sectors;
providing a plurality of micro-regulators disposed in the plurality of circuit sectors wherein the plurality of micro-regulators correspond to the plurality of circuit sectors, each micro-regulator configured to provide current to the corresponding circuit sector at a current injection point;
receiving a plurality of feedback signals corresponding to one or more sense points within each circuit sector, wherein in response to at least one sector being overwhelmed by other sectors, causing the at least one sector to fall into an inactive current state, the micro-regulator corresponding to the at least one sector mitigates the inactive current state by incorporating control logic that generates an UP code over a selected time interval; and
providing control signals to the plurality of micro-regulators that limit load-sharing imbalance within the plurality of micro-regulators.

14. The method of claim 13, wherein the load-sharing imbalance is limited to 20:1.

15. The method of claim 13, wherein limiting load-sharing imbalance prevents zero percent current delivery operation in each micro-regulator.

16. The method of claim 13, wherein the plurality of feedback signals comprise analog signals.

17. An apparatus comprising:
a micro-regulator disposed in an integrated circuit and configured to provide current to the integrated circuit at a current injection point;
a control module configured to receive a plurality of feedback signals corresponding to a plurality of sense points within the integrated circuit and provide a control signal to the micro-regulator, wherein in response to at least one sector being overwhelmed by other sectors, causing the at least one sector to fall into an inactive current state, the micro-regulator corresponding to the at least one sector mitigates the inactive current state by incorporating control logic that generates an UP code over a selected time interval; and
wherein the micro-regulator comprises a charge pump that provides a local reference voltage that enables the micro-regulator to suppress local voltage drooping during feedback transitions.

18. The apparatus of claim 17, further comprising one or more voltage sensors disposed in the integrated circuit and configured to sense a circuit voltage at each of the plurality of sense points.

19. The apparatus of claim 18, wherein the one or more voltage sensors comprise one or more analog-to-digital converters.

20. The apparatus of claim 17, wherein the control module selects a lowest voltage feedback signal of the plurality of feedback signals as the control signal.

* * * * *